United States Patent
Haynes et al.

(10) Patent No.: US 10,556,697 B2
(45) Date of Patent: Feb. 11, 2020

(54) LIGHT WEIGHT RESTRAINT FOR EVACUATION SLIDE SYSTEMS

(71) Applicant: Goodrich Corporation, Charlotte, NC (US)

(72) Inventors: Timothy C Haynes, Prescott Valley, AZ (US); Daniel Bahena, Phoenix, AZ (US); Jevon Broom, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 492 days.

(21) Appl. No.: 15/405,854

(22) Filed: Jan. 13, 2017

(65) Prior Publication Data

US 2018/0201380 A1    Jul. 19, 2018

(51) Int. Cl.
*B64D 25/14*    (2006.01)

(52) U.S. Cl.
CPC .................. *B64D 25/14* (2013.01)

(58) Field of Classification Search
CPC ........ B64D 25/14; B64D 25/00; B64D 25/08; B63B 2027/145; B61B 12/00
See application file for complete search history.

(56) References Cited

U.S. PATENT DOCUMENTS

| | | |
|---|---|---|
| 3,391,771 A | 7/1968 | Day |
| 3,554,344 A * | 1/1971 | Summer ............... B64D 25/14 182/48 |
| 3,606,939 A | 9/1971 | Summer |
| 3,669,217 A | 6/1972 | Fisher |
| 3,793,498 A | 2/1974 | Matsui |
| 3,897,861 A | 8/1975 | Miller et al. |
| 3,944,023 A * | 3/1976 | Fisher ..................... A62B 1/20 182/48 |
| 4,089,545 A | 5/1978 | Ferry |
| 4,460,062 A * | 7/1984 | Fisher .................. B64D 25/14 182/48 |
| 4,526,262 A * | 7/1985 | Malcolm .............. B64D 25/14 182/48 |
| 4,567,977 A * | 2/1986 | Fisher ..................... A62B 1/20 182/48 |
| 4,850,295 A | 7/1989 | Weaver |
| 5,195,217 A | 3/1993 | Arntzen |

(Continued)

FOREIGN PATENT DOCUMENTS

| | | |
|---|---|---|
| EP | 0110206 A1 | 6/1984 |
| EP | 0163925 | 12/1985 |

(Continued)

OTHER PUBLICATIONS

EP Search Report dated Mar. 2, 2018 in EP Application 18150481.2.

(Continued)

*Primary Examiner* — Banjamin P Lee
(74) *Attorney, Agent, or Firm* — Snell & Wilmer, L.L.P.

(57) ABSTRACT

A releasable restraint for an evacuation system may comprise a first female fastener, a second female fastener, and a center member coupled between the first female fastener and the second female fastener, wherein the center member is configured to separate in response to a predetermined tensile force. The releasable restraint may further comprise a first tape extending from the first female fastener and a second tape extending from the second female fastener.

17 Claims, 6 Drawing Sheets

(56) References Cited

U.S. PATENT DOCUMENTS

| | | | | |
|---|---|---|---|---|
| 5,398,383 | A * | 3/1995 | Bingold | E05B 75/00 24/16 PB |
| 5,466,082 | A * | 11/1995 | Sherar | B66C 15/00 403/157 |
| 5,711,495 | A | 1/1998 | Danielson | |
| 5,871,180 | A * | 2/1999 | Hublikar | B64D 25/14 193/25 B |
| 6,196,033 | B1 * | 3/2001 | Dowdle | E05B 75/00 24/16 PB |
| 6,814,183 | B2 | 11/2004 | Horvath | |
| 8,066,108 | B2 | 11/2011 | Hentges | |
| 9,296,484 | B2 | 3/2016 | Biro | |
| D753,885 | S * | 4/2016 | Hill | D29/120.2 |
| 10,189,573 | B2 * | 1/2019 | Haynes | B64D 25/14 |
| 2002/0175024 | A1 * | 11/2002 | Kurtgis | A62B 35/0075 182/3 |
| 2004/0094361 | A1 | 5/2004 | Gronlund et al. | |
| 2012/0090521 | A1 | 4/2012 | Zablocki | |
| 2013/0200217 | A1 | 8/2013 | Biro | |
| 2013/0256159 | A1 | 10/2013 | Walsh | |
| 2014/0224937 | A1 | 8/2014 | Brown | |
| 2016/0107755 | A1 | 4/2016 | Bessettes et al. | |
| 2016/0367845 | A1 | 12/2016 | Bouquier | |
| 2018/0170559 | A1 * | 6/2018 | Haynes | B64D 25/18 |
| 2018/0201379 | A1 * | 7/2018 | Bahena | B64D 25/14 |
| 2018/0201381 | A1 * | 7/2018 | Volny | B64D 25/14 |
| 2018/0273189 | A1 * | 9/2018 | Haynes | B63C 9/22 |
| 2018/0273192 | A1 * | 9/2018 | Haynes | F16B 19/02 |
| 2018/0312265 | A1 * | 11/2018 | Haynes | B64D 25/14 |
| 2018/0334256 | A1 * | 11/2018 | Haynes | B64D 25/14 |

FOREIGN PATENT DOCUMENTS

| | | | | |
|---|---|---|---|---|
| EP | | 0260354 | 3/1988 | |
| EP | | 3348482 A1 * | 7/2018 | B64D 25/14 |

OTHER PUBLICATIONS

USPTO, Restriction/Election Requirement dated Jan. 30, 2019 in U.S. Appl. No. 15/407,818.
USPTO, First Action Interview Office Action dated Jul. 10, 2018 in U.S. Appl. No. 15/407,852.
USPTO, Non Final Office Action dated Apr. 12, 2019 in U.S. Appl. No. 15/407,818.
Extended European Search Report dated Feb. 7, 2018 in European Application No. 18150447.3.
Extended European Search Report dated Feb. 22, 2018 in European Application No. 18151883.8.
Bahena et al., U.S. Appl. No. 15/405,835, filed Jan. 13, 2017 entitled "Secondary Release Arrangement for Evacuation Slide Systems".
Volny et al., U.S. Appl. No. 15/407,818, filed Jan. 17, 2017 entitled "Shock Absorbing Evacuation System Restraint".
Volny et al., U.S. Appl. No. 15/407,852, filed Jan. 17, 2017 entitled "Continuously Restrained Evacuation System".
European Patent Office, European Search Report dated Mar. 27, 2018 in Application No. 18150827.6-1010.
USPTO, Pre-Interview First Office Action dated Apr. 3, 2018 in U.S. Appl. No. 15/407,852.
European Patent Office, European Office Action dated Apr. 3, 2019 in Application No. 18150827.6.
USPTO, Final Office Action dated Apr. 22, 2018 in U.S. Appl. No. 15/407,852.
European Office Action dated May 7, 2019 in European Application No. 18150447.3.
USPTO, Notice of Allowance dated Jun. 4, 2019 in U.S. Appl. No. 15/407,852.
USPTO, Pre-Interview First Office Action dated Jul. 3, 2019 in U.S. Appl. No. 15/405,835.
USPTO, Notice of Allowance dated Aug. 1, 2019 in U.S. Appl. No. 15/407,818.
European Patent Office, European Office Action dated May 16, 2019 in Application No. 18151883.8.

* cited by examiner

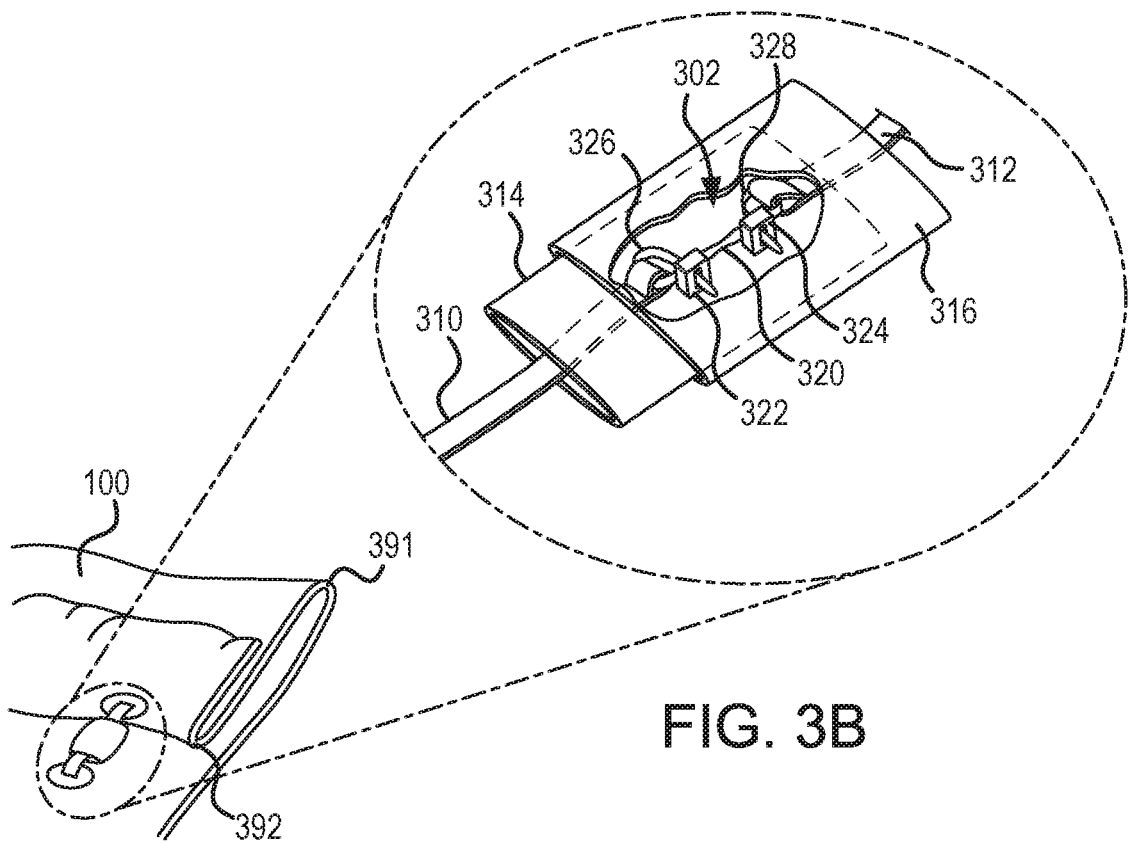
FIG. 3B
FIG. 3A
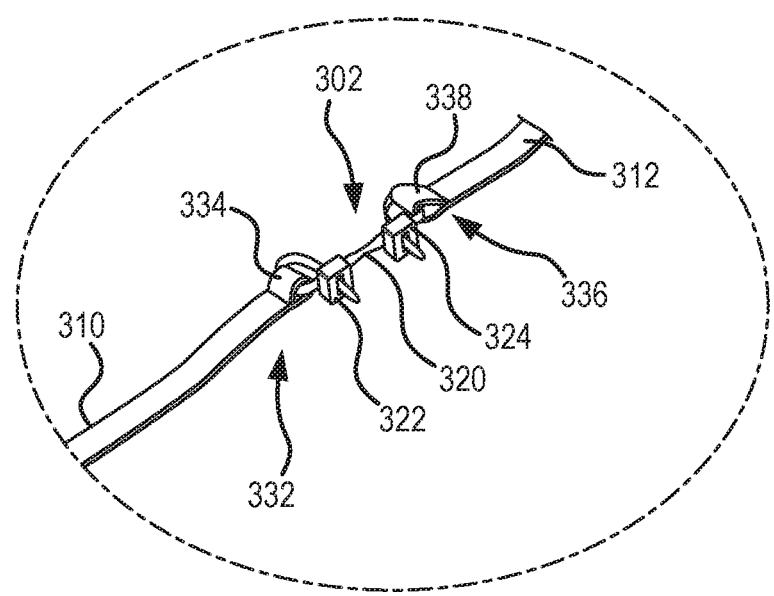
FIG. 3C

LIGHT WEIGHT RESTRAINT FOR EVACUATION SLIDE SYSTEMS

FIELD

The present disclosure relates to inflatable evacuation slides and, in particular, to restraint release systems and methods for evacuation slides.

BACKGROUND

Emergency evacuation slides may be used to exit an aircraft absent a jet way or other suitable means of egress for passengers. The slides may deploy from a door sill or a side of the aircraft fuselage, for example. The slide deployment is controlled by restraints placed throughout the length of the slide which release in stages in response to internal slide pressure.

SUMMARY

In various embodiments, a releasable restraint for an evacuation system is disclosed. A releasable restraint for an evacuation system may comprise a first female fastener, a second female fastener, and a center member coupled between the first female fastener and the second female fastener, wherein the center member is configured to separate in response to a predetermined tensile force.

In various embodiments, the center member may comprise a first end coupled to the first female fastener, a second end coupled to the second female fastener, and a midpoint between the first end and the second end, wherein the center member is tapered from the first end to the midpoint and from the second end to the midpoint, and the center member is configured to separate at the midpoint. The releasable restraint may be in operable communication with the evacuation system and the center member may define a weakest portion of the releasable restraint and as such define the point of separation of the releasable restraint when loaded during deployment of the evacuation system. The releasable restraint may further comprise a first tape extending from the first female fastener, and a second tape extending from the second female fastener, wherein the first tape may be located opposite the first female fastener from the center member and the second tape may be located opposite the second female fastener from the center member. The first female fastener may be configured to receive and retain the first tape and the second female fastener may be configured to receive and retain the second tape. The releasable restraint may comprise a plastic material. The first tape may comprise first plurality of teeth configured engage with a first pawl in the first female fastener. The second tape may comprise a second plurality of teeth configured engage with a second pawl in the second female fastener. A length of the center member may be between 0.25 inches and 0.75 inches. A length of at least one of the first tape and the second tape may be between 2.5 inches and 5 inches. The center member may be configured to separate in response to a tensile force of between 170 and 600 pounds.

In various embodiments, an evacuation system is disclosed. An evacuation system may comprise an evacuation slide configured to be deployed from an aircraft, comprising a head end and a toe end, a first strap coupled to the evacuation slide, a second strap coupled to the evacuation slide, a releasable restraint comprising a first female fastener, a second female fastener, and a center member coupled between the first female fastener and the second female fastener, wherein the center member is configured to separate in response to a predetermined tensile force.

In various embodiments, the center member may comprise an hourglass geometry. The releasable restraint may further comprise a first tape extending from the first female fastener, and a second tape extending from the second female fastener, wherein the first tape may be located opposite the first female fastener from the center member and the second tape may be located opposite the second female fastener from the center member. The first female fastener may be configured to receive and retain the first tape and the second female fastener may be configured to receive and retain the second tape. The releasable restraint may comprise a plastic material. The first tape may comprise a first plurality of teeth configured engage with a first pawl in the first female fastener. The second tape may comprise a second plurality of teeth configured engage with a second pawl in the second female fastener.

In various embodiments, a method for restraining an evacuation slide is disclosed. A method for restraining an evacuation slide may comprise extending a first tape through a first loop formed by a first strap coupled to the evacuation slide, extending the first tape through a first female fastener, retaining, by the first female fastener, the first tape, extending a second tape through a second loop formed by a second strap coupled to the evacuation slide, extending the second tape through a second female fastener, retaining, by the second female fastener, the second tape, and extending a center member between the first female fastener and the second female fastener.

In various embodiments, the method may further comprise separating the center member in response to a predetermined tensile force.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIGS. 3A, 3B, and 3C illustrate a restraint aiding in retaining the evacuation slide in a folded position, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Slides according to the present disclosure may extend from an aircraft structure, such as a fuselage or a wing, for example, to an exit surface in a fully deployed position. During deployment, a plurality of restraints may aid in controlling the inflation process of the slide. The restraints may be configured to de-couple in response to internal slide pressure. A releasable restraint is provided. Releasable restraints, according to the present disclosure, may provide weight savings, reduced packaging density, and restraint dependability.

Figure 1:
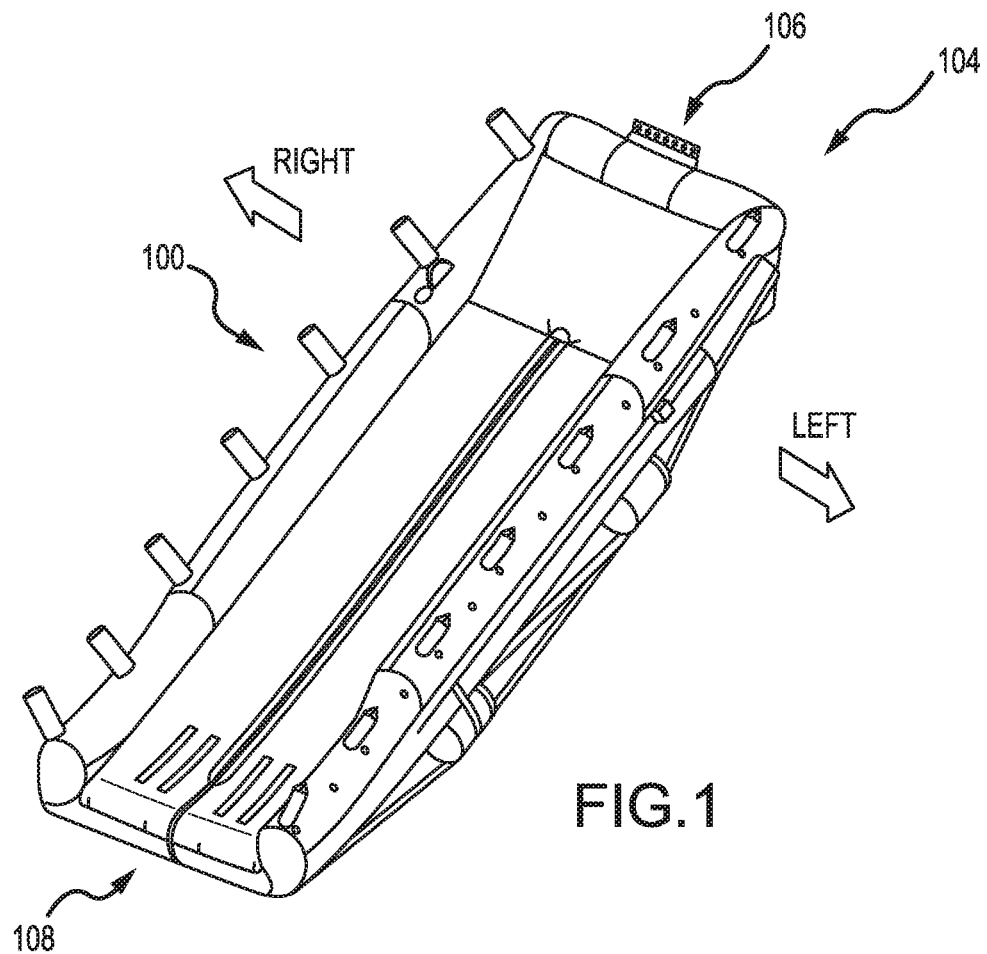
FIG. 1 illustrates a perspective view of an evacuation slide in a deployed position, in accordance with various embodiments.

With respect to FIG. 2 through FIG. 5, elements with like element numbering, as depicted in FIG. 1, are intended to be the same and will not necessarily be repeated for the sake of clarity. With respect to FIG. 5, elements with like element numbering, as depicted in FIG. 4, are intended to be the same and will not necessarily be repeated for the sake of clarity.

With reference to FIG. 1, an evacuation system 104 is illustrated, in accordance with various embodiments. Evacuation system 104 may comprise evacuation slide 100. Evacuation slide 100 may comprise a head end 106 and a toe end 108. Head end 106 may be coupled to aircraft structure. Evacuation slide 100 may comprise an inflatable slide. FIG. 1 illustrates evacuation slide 100 in an inflated and/or deployed position. Evacuation slide 100 may comprise a dual lane slide. However, evacuation slide 100 may comprise any number of lanes. Toe end 108 may contact an exit surface in response to evacuation slide 100 being deployed.

Figure 2:
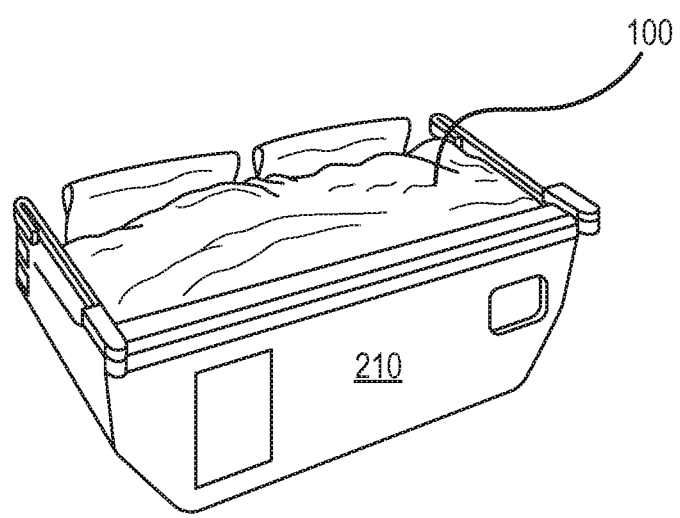
FIG. 2 illustrates a perspective view of an evacuation slide in a stowed position, in accordance with various embodiments.

With reference to FIG. 2, evacuation slide 100 is illustrated in a stowed and/or packed position. In this regard, evacuation slide 100 may be stowed in a packboard 210. In various embodiments, evacuation slide 100 may be folded in the stowed position. In various embodiments, evacuation slide 100) may be deployed from packboard 210 in response to opening an emergency exit door. Packboard 210 may be coupled to an aircraft in an installed position. Typically, a packboard 210 includes a blow-out panel which opens in response to deployment of evacuation slide 100 through which opening the inflatable may exit the packboard. In this regard, evacuation slide 100 may be configured to be deployed from an aircraft.

With reference to FIG. 3A and FIG. 3B, evacuation slide 100 is illustrated in a folded position, in accordance with various embodiments. For example, evacuation slide 100) may include a plurality of folds, including first fold 391 and second fold 392, when evacuation slide 100 is in the folded or stowed position. Releasable restraint 302 may aid in maintaining first fold 391 and/or second fold 392. Releasable restraint 302 may aid in staged deployment of evacuation slide 100. Evacuation slide 100 may unfold in response to releasable restraint 302 separating.

In various embodiments, releasable restraint 302 may be configured to separate in response to an internal pressure in evacuation slide 100. For example, a gas cylinder may supply a flow of pressurized fluid to evacuation slide 100 in response to evacuation slide 100 being deployed. Evacuation slide 100 may begin to inflate and an internal pressure of evacuation slide 100 may increase. Releasable restraint 302 may maintain evacuation slide 100 in a folded position until the internal pressure has increased above a predetermined threshold value. Evacuation slide 100 may unfold in response to releasable restraint 302 separating. In this regard, evacuation slide 100 may fully deploy in response to releasable restraint 302 separating.

Releasable restraint 302 may comprise a first female fastener 322, a second female fastener 324, a center member 320, a first tape 326, and a second tape 328. Releasable restraint 302 may comprise a single, unitary member. Stated differently, first female fastener 322, second female fastener 324, center member 320, first tape 326, and second tape 328 may comprise a single, unitary member. First tape 326 may form a first loop through which a first strap 310 is located. Second tape 328 may form a second loop through which a second strap 312 is located. In this regard, first tape 326 and second tape 328 may be flexible. In various embodiments, a first cover 314 may surround releasable restraint 302. A second cover 316 may surround releasable restraint 302. Second cover 316 may surround at least a portion of first cover 314. First cover 314 and second cover 316 may comprise a fabric. For example, first cover 314 and second cover 316 may comprise nylon, ballistic nylon, polypropylene, polyester, cotton, or any other suitable material.

In various embodiments, releasable restraint 302 may comprise a cable tie, also known as a zip tie. Releasable restraint 302 may comprise a plastic material, such as nylon. First female fastener 322, second female fastener 324, center member 320, first tape 326, and second tape 328 may comprise a plastic material, such as nylon. In various embodiments, releasable restraint 302 may comprise nylon 66 and/or nylon 12. In various embodiments, releasable restraint 302 may comprise a fluoropolymer. Releasable restraint 302 may comprise a flame retardant. In various embodiments, releasable restraint 302 may be configured to withstand temperatures up to 3740° F. (2060° C.) or more.

With reference to FIG. 3C, releasable restraint 302, first strap 310, and second strap 312 are illustrated with first cover 314 and second cover 316 omitted for clarity purposes. First strap 310 may be coupled between evacuation slide 100 and releasable restraint 302. First strap 310 may be coupled to releasable restraint 302 via first tape 326. An end 332 of first strap 310 may form a first loop 334. In various embodiments, first strap 310 may be looped around first tape 326 and sewn to itself. Stated differently, first tape 326 may be inserted through loop 334 and fastened to first female fastener 322. Second strap 312 may be coupled between evacuation slide 100 and releasable restraint 302. An end 336 of second strap 312 may form a second loop 338. In various embodiments, second tape 328 may be inserted through loop 338 and fastened to second female fastener 324.

In various embodiments, first strap 310 and/or second strap 312 may comprise a rope, tape, ribbon, webbing, or any other suitable strap. In various embodiments, first strap 310 and/or second strap 312 may comprise nylon, ballistic nylon, polypropylene, polyester, cotton, or any other suitable material.

Figure 4A:
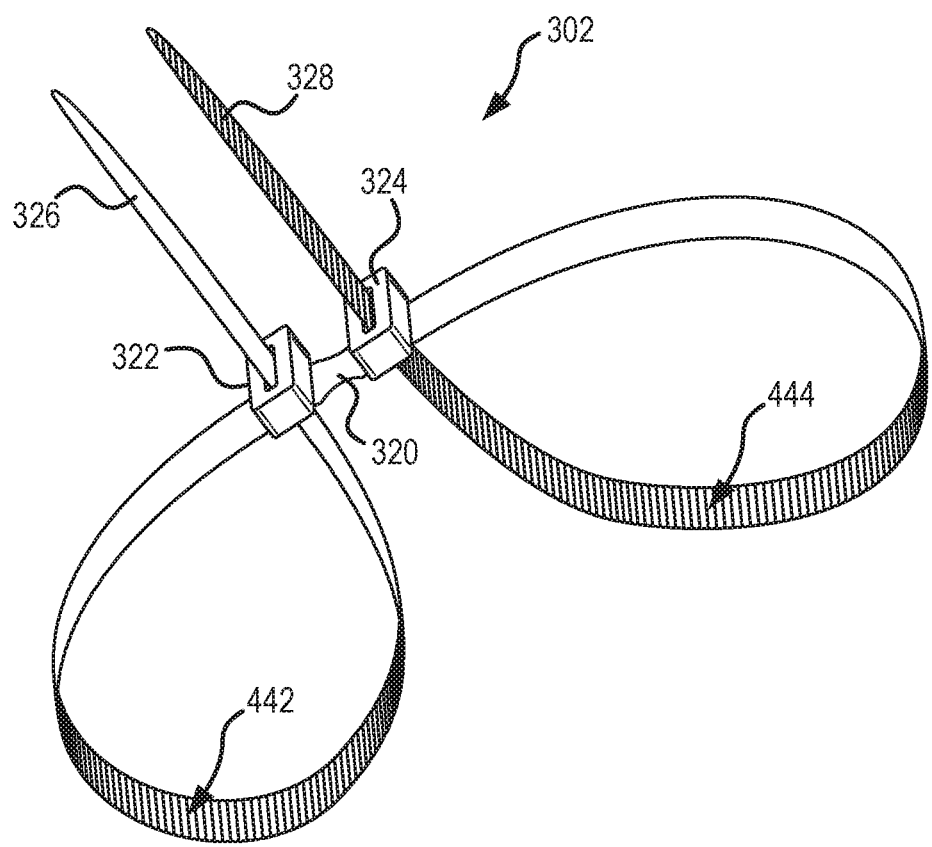
FIG. 4A illustrates a perspective view of a restraint in a locked position, in accordance with various embodiments.

With reference to FIG. 4A, releasable restraint 302 is illustrated in a locked position, in accordance with various embodiments. Center member 320 may be coupled between first female fastener 322 and second female fastener 324. First tape 326 may extend from first female fastener 322. Second tape 328 may extend from second female fastener 324. First tape 326 may comprise a first plurality of teeth 442. First plurality of teeth 442 may engage with first female fastener 322. Second tape 328 may comprise a second plurality of teeth 444. Second plurality of teeth 444 may engage with second female fastener 324.

Figure 4B:
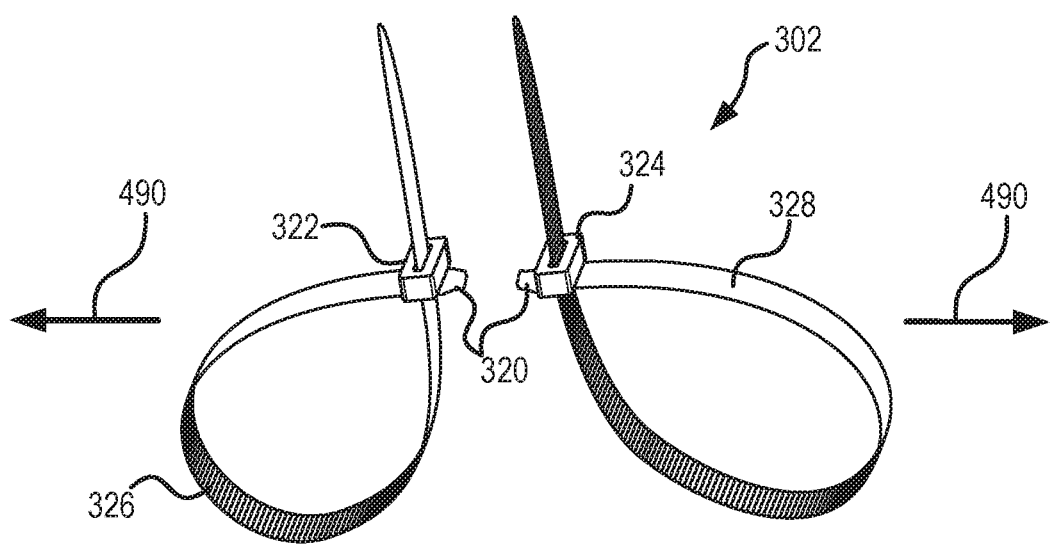
FIG. 4B illustrates a perspective view of a restraint with a separated center member, in accordance with various embodiments.

With reference to FIG. 4B, center member 320 is illustrated in a separated position, in accordance with various embodiments. First female fastener 322 may separate from second female fastener 324 in response to a predetermined force, such as tensile force 490. In various embodiments, center member 320 may comprise a frangible member. Tensile force 490 may be generated in response to an internal pressure of the evacuation slide 100, with momentary reference to FIG. 3A, for example during inflation. In this regard, releasable restraint 302 may be in operable communication with evacuation slide 100. In various embodiments, center member 320 may define a weakest portion of the releasable restraint 302 and as such define the point of separation of the releasable restraint 302 when loaded during deployment of the evacuation slide 100. In this regard, center member 320 may be configured to withstand forces below a threshold value and may be configured to separate in response to forces above the threshold value. In various embodiments, center member 320 may be configured to separate in response to a tensile force 490 of between 150 pounds and 700 pounds (667 N-3114 N), and in various embodiments in response to a tensile force 490 of between 170 pounds and 600 pounds (756 N-2669 N), and in various embodiments, in response to a tensile force of between 170 pounds and 300 pounds (756 N-1334 N). In various embodiments, center member 320 may be configured to separate in response to a tensile force 490 of any suitable value greater than zero.

In various embodiments, a plurality of releasable restraints 302 may be provided in parallel to withstand a predetermined force. For example, if it is desired that a restraint breaks at about 600 pounds, two releasable restraints configured to withstand 300 pounds may be provided in parallel to withstand the 600 pound force. In response to a tensile force greater than 600 pounds, the two restraints may break, allowing an evacuation system to fully deploy.

Figure 5A:
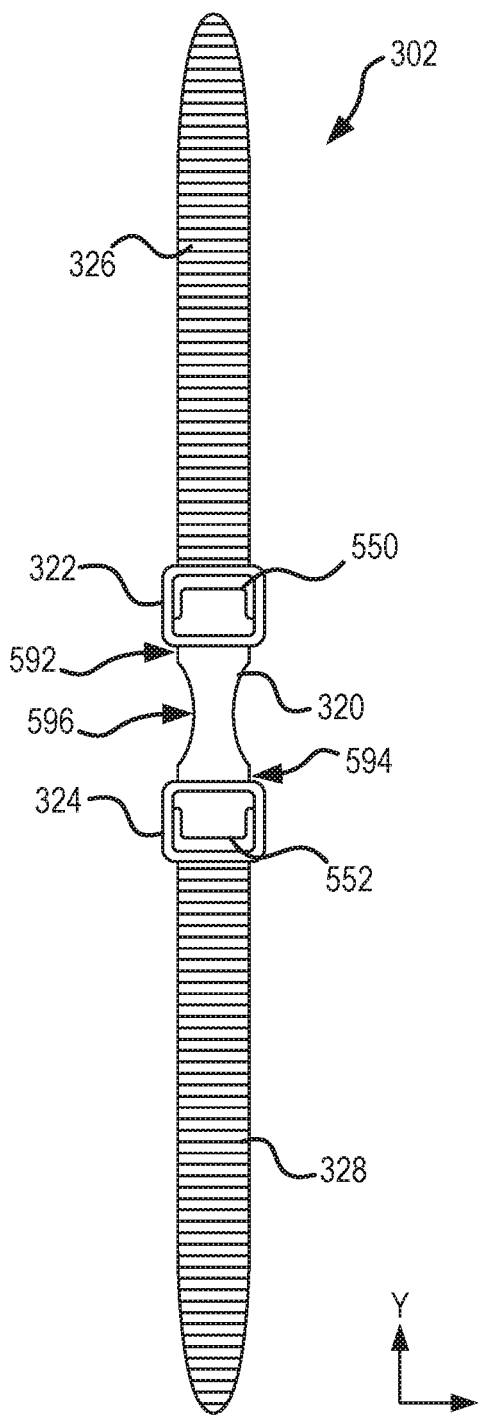
FIGS. 5A and 5B illustrates a top view and a side view, respectively, of a restraint in an unlocked position, in accordance with various embodiments.
Figure 5B:
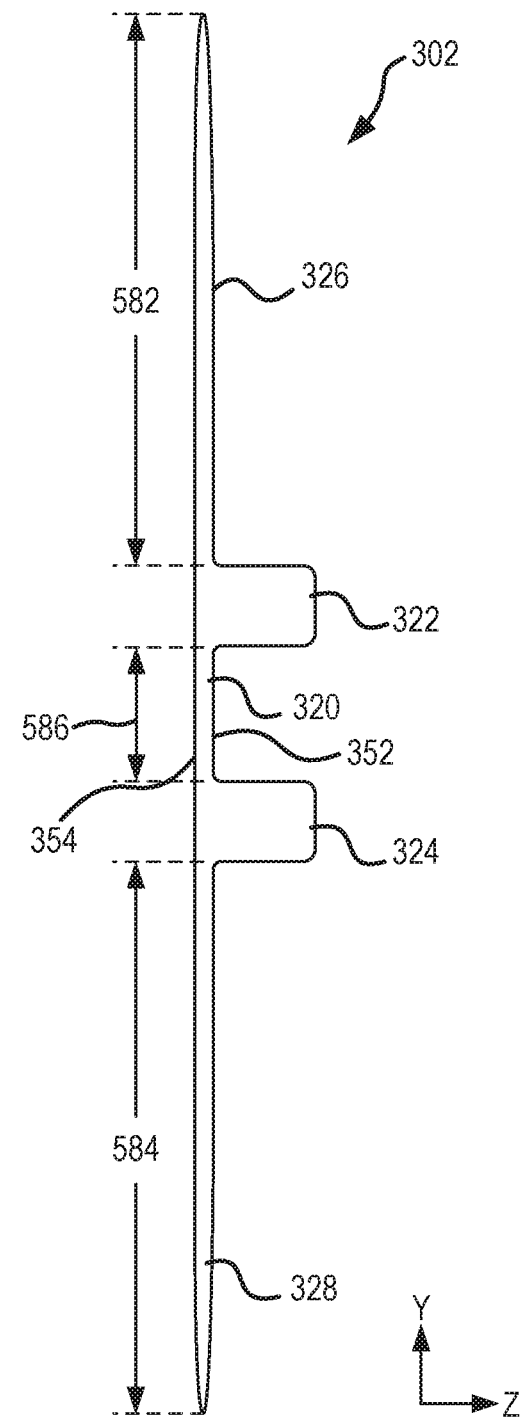
Figure 7:
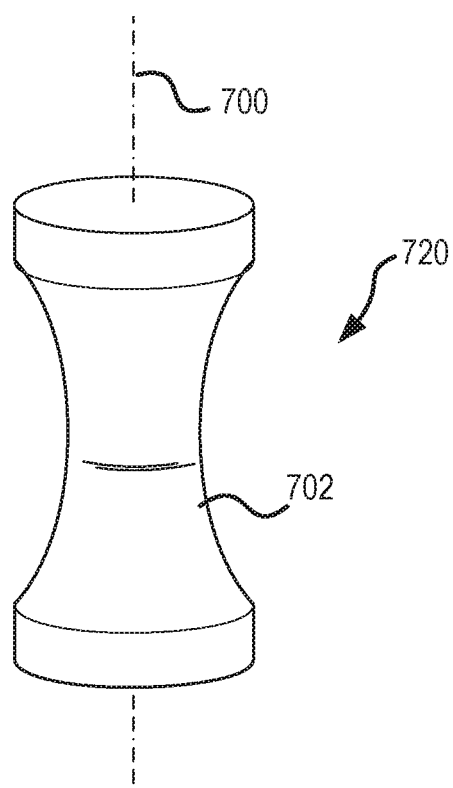
FIG. 7 illustrates a center member, in accordance with various embodiments.

With combined reference to FIG. 5A and FIG. 5B, a front view and a side view, respectively, of releasable restraint 302 is illustrated, in accordance with various embodiments. Xyz-axes are provided for ease of illustration. In various embodiments, center member 320 may comprise an hourglass geometry. Center member 320 may comprise an hourglass geometry in the xy-plane. In this regard, an hourglass shape refers to center member 320 comprising two concave surfaces, a "necked" geometry, and/or a reduction in cross-sectional area (in the xz-plane). Center member 320 may comprise a substantially planar first surface 352 and a substantially planar second surface 354. However, with momentary reference to FIG. 7, a center member 720 may comprise an axisymmetric hourglass geometry. In this regard, center member 720 may comprise an outer surface 702 comprise a concave geometry and being axisymmetric about centerline axis 700. With combined reference again to FIG. 5A and FIG. 5B, center member 320 may comprise a first end 592 coupled to first female fastener 322. Center member 320 may comprise a second end 594 coupled to second female fastener 324. Center member 320 may comprise a midpoint 596 located between first end 592 and second end 594. Center member 320 may be tapered from first end 592 to midpoint 596 and from second end 594 to midpoint 596. Center member 320 may be configured to separate at midpoint 596. Center member 320 may be configured to separate at a location of minimum cross-sectional area. Midpoint 596 may be a location of minimum cross-sectional area (in the xz-plane) of center member 320.

First female fastener 322 may comprise a first pawl 550 configured to engage with first plurality of teeth 442, with momentary reference to FIG. 4A. Second female fastener 324 may comprise a second pawl 552 configured to engage with second plurality of teeth 444, with momentary reference to FIG. 4A.

In various embodiments, first tape 326 may comprise a length 582. In various embodiments, length 582 may be between 2 inches and 12 inches (5.08 cm-30.48 cm), and in various embodiments, between 2.5 inches and 6 inches (6.35 cm-15.24 cm), and in various embodiments, between 2.5 inches and 5 inches (6.35 cm-12.7 cm), and in various embodiments, about 3 inches (7.62 cm), wherein the term "about" in this regard means ±0.5 inches (±1.27 cm). In various embodiments, second tape 328 may comprise a length 584. Length 584 may be similar to length 582.

In various embodiments, center member 320 may comprise a length 586. In various embodiments, length 586 may be between 0.1 inches and 1 inch (0.254 cm-2.54 cm), and in various embodiments, between 0.25 inches and 0.75 inch (0.64 cm-1.91 cm), and in various embodiments, about 0.375 inches (0.953 cm), wherein the term "about" in this regard means ±0.1 inches (±0.254 cm). However, it is contemplated herein that length 586 may be any suitable length.

First tape 326 may be located opposite the first female fastener 322 from the center member 320. Second tape 328 may be located opposite the second female fastener 324 from the center member 320.

Figure 6:
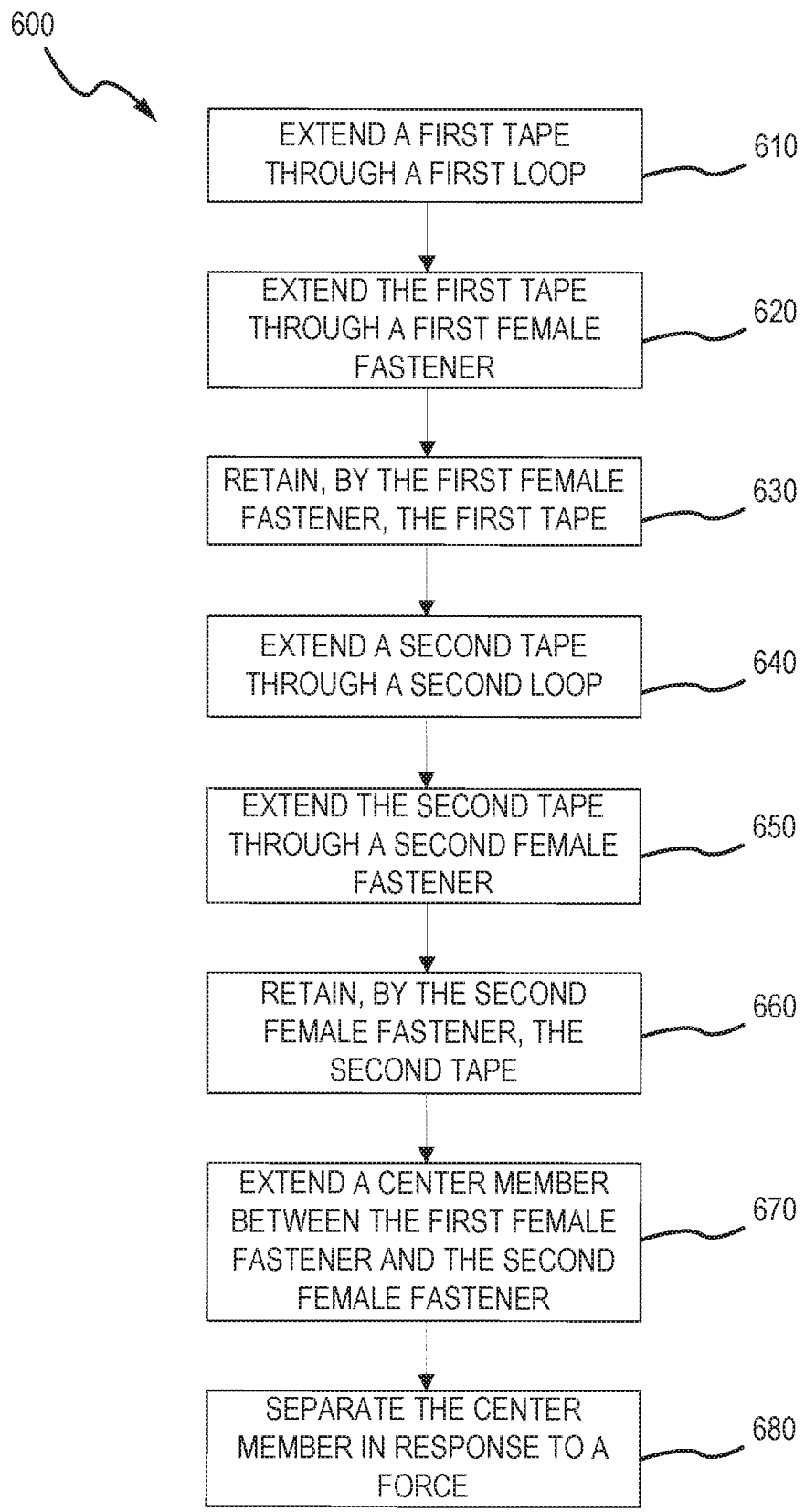
FIG. 6 illustrates a method for manufacturing an evacuation slide, in accordance with various embodiments.

With reference to FIG. 6, a method 600 for restraining an evacuation slide is provided, in accordance with various embodiments. Method 600 includes extending a first tape through a first loop (step 610). Method 600 includes extending the first tape through a first female fastener (step 620). Method 600 includes retaining, by the first female fastener, the first tape (step 630). Method 600 includes extending a second tape through a second loop (step 640). Method 600 includes extending the second tape through a second female fastener (step 650). Method 600 includes retaining, by the second female fastener, the second tape (step 660). Method

600 includes extending a center member between the first female fastener and the second female fastener (step 670). Method 600 may include separating the center member in response to a force (step 680).

In various embodiments, with combined reference to FIG. 3A, FIG. 3B, FIG. 3C, and FIG. 6, step 610 may include extending first tape 326 through first loop 334 formed by first strap 310 coupled to evacuation slide 100. Step 620 may include extending first tape 326 through first female fastener 322. Step 630 may include retaining, by first female fastener 322, the first tape 326. Step 640 may include extending second tape 328 through second loop 338 formed by second strap 312 coupled to the evacuation slide 100. Step 650 may include extending second tape 328 through second female fastener 324. Step 660 may include retaining, by second female fastener 324, second tape 328. Step 670 may include extending center member 320 between first female fastener 322 and second female fastener 324 to couple first female fastener 322 to second female fastener 324. Step 680 may include separating center member 320 in response to a predetermined tensile force 490.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A releasable restraint for an evacuation system comprising:
    a first female fastener;
    a second female fastener;
    a center member coupled between the first female fastener and the second female fastener, the center member is configured to separate in response to a predetermined tensile force;
    a first tape extending from the first female fastener; and
    a second tape extending from the second female fastener;
    wherein the first female fastener is configured to receive and retain the first tape and the second female fastener is configured to receive and retain the second tape, and the first female fastener, the second female fastener, the center member, the first tape, and the second tape comprise a single, unitary member.

2. The releasable restraint of claim 1, wherein the releasable restraint is in operable communication with the evacuation system and the center member defines a weakest portion of the releasable restraint and as such defines the point of separation of the releasable restraint when loaded during deployment of the evacuation system.

3. The releasable restraint of claim 2, wherein the center member comprises:
    a first end coupled to the first female fastener;
    a second end coupled to the second female fastener; and
    a midpoint between the first end and the second end,
    wherein the center member is tapered from the first end to the midpoint and from the second end to the midpoint, and
    the center member is configured to separate at the midpoint.

4. The releasable restraint of claim 3,
    wherein the first tape is located opposite the first female fastener from the center member and the second tape is located opposite the second female fastener from the center member.

5. The releasable restraint of claim 1, wherein the releasable restraint comprises a plastic material.

6. The releasable restraint of claim 1, wherein first tape comprises first plurality of teeth configured to engage with a first pawl in the first female fastener and the second tape comprises a second plurality of teeth configured to engage with a second pawl in the second female fastener.

7. The releasable restraint of claim 1, wherein a length of the center member is between 0.25 inches and 0.75 inches.

8. The releasable restraint of claim 4, wherein a length of at least one of the first tape and the second tape is between 2.5 inches and 5 inches.

9. The releasable restraint of claim 1, wherein the tensile force is between 170 and 600 pounds.

10. An evacuation system, comprising:
    an evacuation slide configured to be deployed from an aircraft, comprising a head end and a toe end;
    a first strap coupled to the evacuation slide;
    a second strap coupled to the evacuation slide;
    a releasable restraint comprising:
        a first female fastener;
        a second female fastener;

a center member coupled between the first female fastener and the second female fastener;

a first tape extending from the first female fastener; and a second tape extending from the second female fastener;

wherein the center member is configured to separate in response to a predetermined tensile force, and the first female fastener is configured to receive and retain the first tape and the second female fastener is configured to receive and retain the second tape, and the first female fastener, the second female fastener, the center member, the first tape, and the second tape comprise a single, unitary member.

11. The evacuation system of claim 10, wherein the center member comprises an hourglass geometry.

12. The evacuation system of claim 11, wherein the first tape is located opposite the first female fastener from the center member and the second tape is located opposite the second female fastener from the center member.

13. The evacuation system of claim 10, wherein the releasable restraint comprises a plastic material.

14. The evacuation system of claim 13, wherein the first tape comprises a first plurality of teeth configured to engage with a first pawl in the first female fastener.

15. The evacuation system of claim 14, wherein the second tape comprises a second plurality of teeth configured to engage with a second pawl in the second female fastener.

16. A method for restraining an evacuation slide, comprising:

extending a first tape through a first loop formed by a first strap coupled to the evacuation slide;

extending the first tape through a first female fastener;

retaining, by the first female fastener, the first tape;

extending a second tape through a second loop formed by a second strap coupled to the evacuation slide;

extending the second tape through a second female fastener;

retaining, by the second female fastener, the second tape; and extending a center member between the first female fastener and the second female fastener, wherein the first female fastener, the second female fastener, the center member, the first tape, and the second tape comprise a single, unitary member.

17. The method according to claim 16, further comprising:

separating the center member in response to a predetermined tensile force.

* * * * *